United States Patent
Putin

[15] 3,685,636
[45] Aug. 22, 1972

[54] CONVEYOR ROLLERS
[72] Inventor: Enrico Putin, 2, Via P. Trevisan, Vicenza, Italy
[22] Filed: June 22, 1970
[21] Appl. No.: 48,257

[52] U.S. Cl. .................................................. 198/127
[51] Int. Cl. ............................................. B65g 13/02
[58] Field of Search ................................... 198/127

[56] References Cited
UNITED STATES PATENTS
2,194,219  3/1940  Eggleston .................. 198/127
1,879,720  9/1932  Von Reis .................... 198/127
1,967,747  7/1934  Eggleston .................. 198/127

Primary Examiner—Evon C. Blunk
Assistant Examiner—H. S. Lane
Attorney—William Anthony Drucker

[57] ABSTRACT

Means for causing rotation of idle rollers of a set of rollers, of one or more shelves of a conveyor framework, have at least one rod for each shelf with such rollers, said rod making contact in a working postion, with the rollers to cause them to rotate and thus move forward the objects placed on them. The contact may be made by friction of a layer of soft material, or by engagement of teeth with toothed pinions, or by belt means, and those idle rollers which are not to be rotated may be braked by braking means controlled by said rods.

1 Claim, 5 Drawing Figures

PATENTED AUG 22 1972

INVENTOR:
ENRICO PUTIN

CONVEYOR ROLLERS

The object of the present invention is to provide means to induce rotation in rollers, revolving idly, of one or more roller planes of a conveyor, particularly for clay shapes to be put into a drier.

In the production of bricks or tiles, frames with several shelves are used to carry the bricks or tiles to be put into the drier.

These frames may be equipped with rollers rotating idly, for example as specified in Italian Pat. No. 780,130 of the same applicant.

As, for convenience, the clay shapes need to be spaced out when they are placed on the shelves, particular skill is required for this purpose.

For example, one may use the loading apparatus described in Italian Pat. No. 678,680 of the same applicant.

It would also be possible to carry out the loading of the clay shapes in spaced-out positions by means of frames in which the rollers were motorised. This however would require electric motors to be mounted on the frames; these would have to be connected to the mains supply each time the frame was put to the loading operation, and in addition complicated and expensive means of transmission would be needed to convey the motion of the motor itself to the individual rollers.

This arrangement, besides being expensive and complicated, when it has to be applied to a large number of frames, would be exceedingly liable to damage and deterioration, since the frames would have to be put inside the driers with the clay shapes placed on them.

However, according to the present invention there is provided a device composed of one or more moving rods arranged to match the loading apparatus; these will induce rotation in the idle rollers on the separate shelves of the frame, thus turning them into motors just for the time needed to carry out the loading.

It is obvious that, on the basis of the new concept now described, it is possible to achieve numerous ways of constructing the invention, all of them included within the scope of the patent as defined in the appended claims.

For example, in a first method of carrying out the invention, the device includes a moving rod for each shelf, equipped underneath with a layer of soft material, e.g. rubber or something similar, which, when coming in contact with the idling rollers, makes them rotate by friction while itself moving forward.

In a second method of carrying out the invention, the movable rod is equipped with a series of teeth, like a rack, which engage with toothed pinions which are integral with the idle rollers, making them rotate while itself moving forward.

A further method of carrying out the invention is to equip the moving rod with a belt rotating on two pulleys keyed to the rod, made to rotate by motors, the belt making contact with the idle rollers for the time needed to transfer the objects arranged on them, being then raised and removed at the end of the operation.

In order to avoid the disadvantages which might be met in using these frames, owing to the fact that the rollers rotate when idle, which causes the pieces resting on them to shift while the frame is being transferred or otherwise at the end of the loading operation, provision is made for the insertion of automatic braking devices in some or all of the idling rollers, so as to stop the rollers from rotating; these devices are disconnected when loading or unloading takes place, by mechanical means connected with the moving rod and acting on it.

By way of non-limiting example, in the accompanying drawing.

Figure 1:
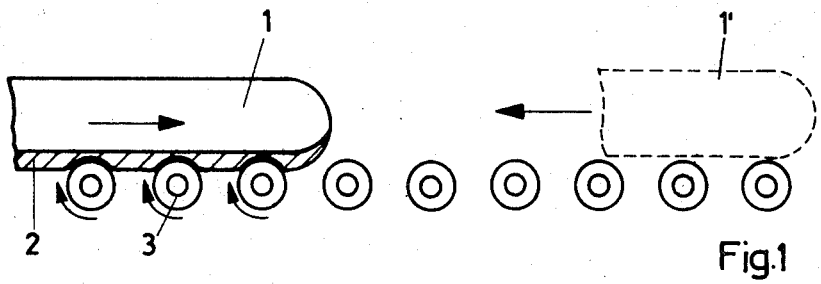
FIG. 1 shows diagrammatically a first method of constructing the invention, with a moving rod equipped with a soft layer underneath.

In the first method of constructing the invention, illustrated in FIG. 1, the rod 1, equipped with a layer underneath 2, in a soft material, e.g. rubber, moves forward and makes contact with the rollers 3, which are idle, and causes them to rotate in the direction shown by arrows, and therefore as a result makes the objects placed over them move forward also.

At the end of the work-stint rod 1 is raised to the position shown by the broken lines and indicated by reference 1', thus breaking contact with the rollers 3, which thus come to a stop.

Figure 2:
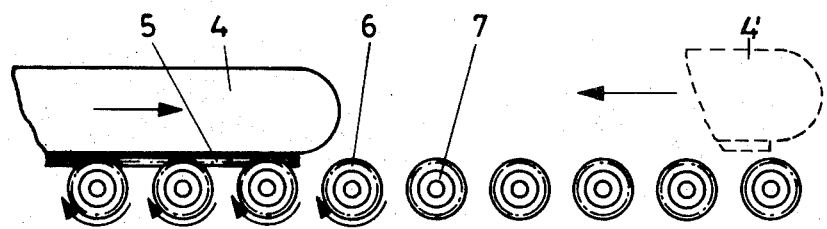
FIG. 2 shows a second method of construction, equipped with a moving rod having rack teeth underneath.

In the second method of constructing the invention, illustrated in FIG 2, rod 4 is furnished with teeth 5 on its lower side, making a rack, these teeth making contact with the teeth 6 of the toothed pinion keyed on to the shafts of the idle rollers 7, making them rotate during the work-stint.

Also in this case, at the end of the work-stint, rod 4 makes a lifting movement, in order to be conveyed to a position corresponding to that shown by broken lines and indicated by reference 4', disengaging the pinion 6 and consequently stopping the rotating movement of rollers 7.

Figure 3:
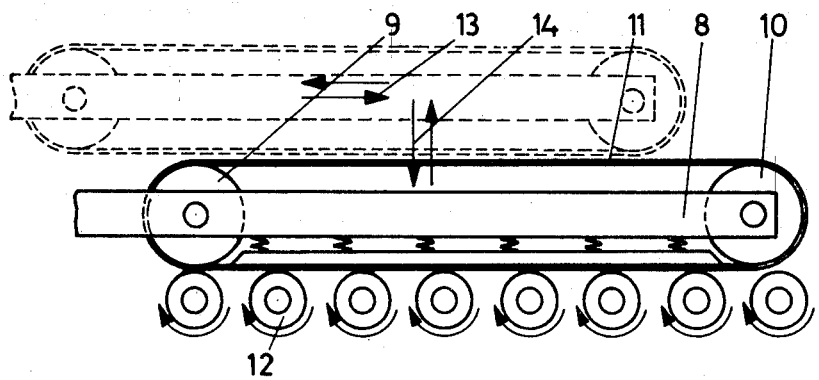
FIG. 3 shows a third method of constructing the invention, with a moving rod equipped with a rotating belt.

In the third method of constructing the invention, illustrated in FIG. 3, rod 8 is equipped with pulleys 9 and 10, which carry belt 11 which, when in the working position, makes contact with rollers 12, which are running idle, and causes them to rotate.

Figure 5:
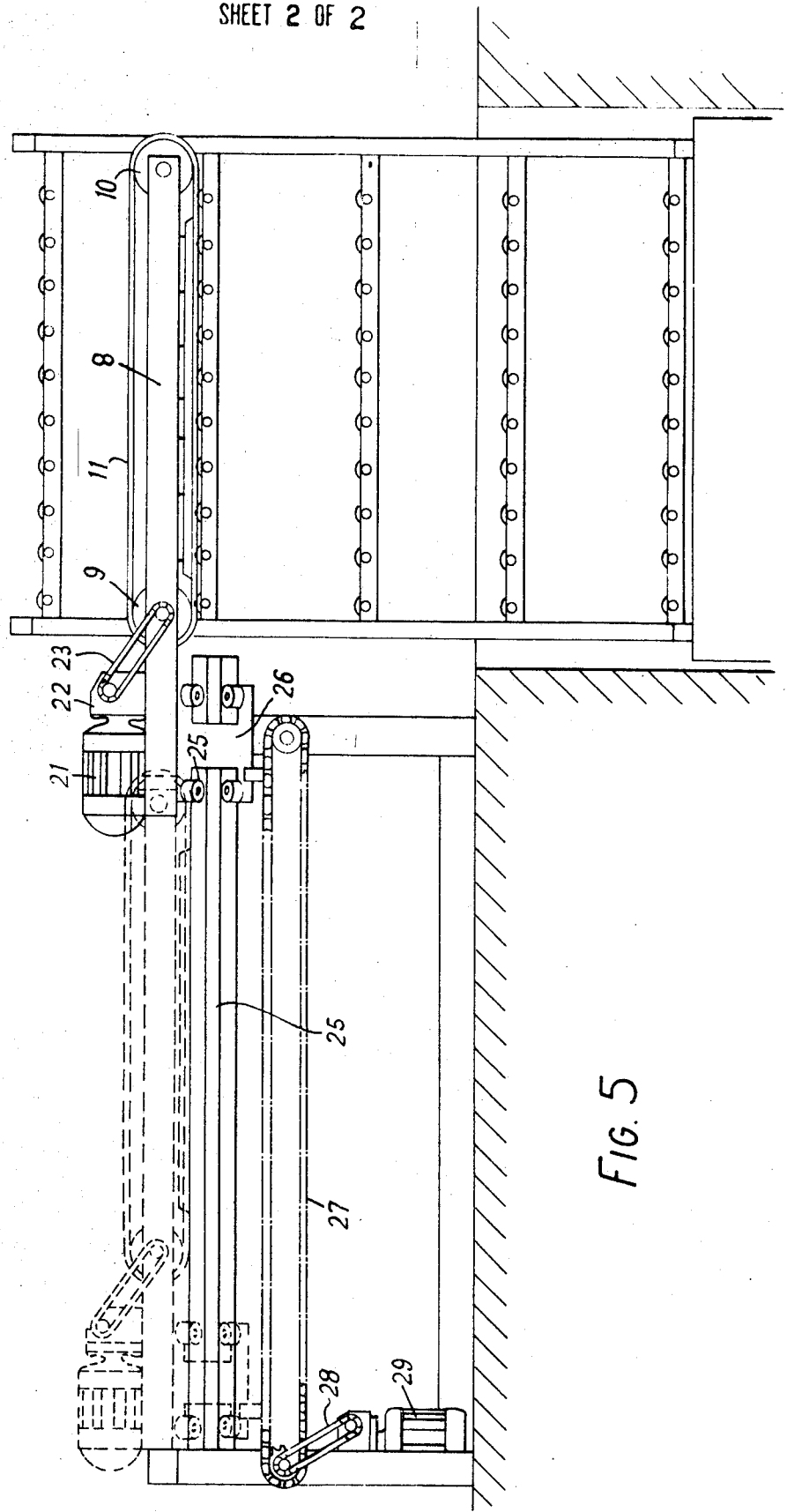
FIG. 5 shows electric control motor means to move the rods.

Naturally, one of the pulleys 9 and 10 is connected mechanically with an electric control motor, as illustrated in FIG. 5.

At the end of the work-stint of rod 8 the latter is raised, disengaging belt 11 from rollers 12.

Rod 8 can be given an approach movement in the direction of arrow 13, which precedes a lowering movement in the direction of arrow 14, before bringing belt 11 in contact with rollers 12. Naturally at the end of the work-phase, which corresponds with the forward movement of the objects placed on rollers 12, rod 8 is displaced in a direction opposite to the arrows 14 and 13 respectively.

Figure 4:
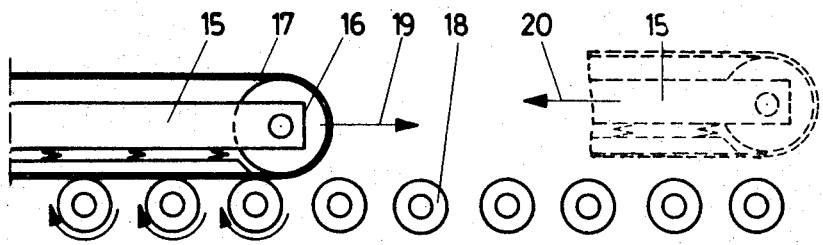
FIG. 4 shows a method of construction like that in FIG. 3 but with a different manner of operation.

In the arrangement illustrated in FIG. 4, rod 15 carrying pulleys 16, which support the belt 17, which in the working phase makes contact with rollers 18, moves forward in the direction of arrow 19 during the working phase, with the result that the rotatory movement of rollers 18 depends on the rotatory movement of belt 17 and on the forward movement of rod 15.

This last, at the end of the working phase, is raised so as to reach the position illustrated by the broken lines in FIG. 4 and shown by the number 15', and so as in turn to come back to a position of rest by moving in the direction of arrow 20.

In FIG. 5, the movable arm 8 can be seen. On it are mounted the pulleys 9 and 10 which carry the endless moving belt 11. This belt is set in rotation by the electric motor 21 which is connected, through the reduction gear 22 to the chain transmission 23 with the pulley 9. The arm 8 runs in its turn by means of the rollers 24 on the guide rod 25 which is set in a fixed position, in proximity to the frame which is furnished with platforms on rollers so that it can rotate.

The trolley 26, on which the moving arm 8 is mounted, in its turn is set in rotation by the endless chain 27, turned by the electric motor 29 via the chain transmission 28.

Naturally the rollers are set in rotation when the arm 8 is inserted above each platform on rollers, it being possible to displace the frame, furnished with platforms on rollers, in a vertical direction, when the arm 8 is completely withdrawn form the platforms on rollers themselves.

I claim:

1. Means driven by an electric motor for causing rotation of idle rollers of a movable set of rollers of one or more shelves of a conveyor framework, wherein at least one longitudinally movable rod for each shelf having such rollers makes lateral connection, in a working position, with said rollers, causing them to rotate and thus moving forward objects placed on them, wherein the rod which is connected to the rollers of the roller platform belonging to the transportation frame includes a belt supported by pulleys keyed to the rod and rotated by said electric motor, said belt contacting said rollers and causing them to rotate by frictional connection between the rotating belt and said rollers.

* * * * *

UNITED STATES PATENT OFFICE
CERTIFICATE OF CORRECTION

Patent No. 3,685,636   Dated August 22, 1972

Inventor(s) Enrico Putin

It is certified that error appears in the above-identified patent and that said Letters Patent are hereby corrected as shown below:

On the cover sheet insert -- [30] Foreign Application Priority Data   July 1, 1969   Italy   61.600/A/69 -- .

Signed and sealed this 1st day of May 1973.

(SEAL)
Attest:

EDWARD M. FLETCHER, JR.
Attesting Officer

ROBERT GOTTSCHALK
Commissioner of Patents